United States Patent [19]

Kubens et al.

[11] 4,114,382

[45] Sep. 19, 1978

[54] PROCESS FOR THE CONSOLIDATION OF GEOLOGICAL FORMATIONS AND LOOSENED ROCK AND EARTH MASSES

[75] Inventors: Rolf Kubens, Odenthal-Hahnenberg; Frank Meyer, Essen, both of Germany

[73] Assignee: Bayer Aktiengesellschaft, Leverkusen, Fed. Rep. of Germany

[21] Appl. No.: 794,593

[22] Filed: May 6, 1977

Related U.S. Application Data

[63] Continuation of Ser. No. 598,108, Jul. 22, 1975, abandoned.

[30] Foreign Application Priority Data

Jul. 26, 1974 [DE] Fed. Rep. of Germany ....... 2436029

[51] Int. Cl.$^2$ ..................... E02D 3/12; C08G 18/65; E21D 11/00
[52] U.S. Cl. ................... 405/264; 405/259
[58] Field of Search ................... 260/2.5 BC, 2.5 BD, 260/2.5 AQ, 2.5 AP, 77.5 AQ, 77.5 AP; 61/36 C, 45 B

[56] References Cited

U.S. PATENT DOCUMENTS

| 2,403,643 | 7/1946 | Dresser | 61/36 |
| 2,764,565 | 9/1956 | Hoppe et al. | 260/2.5 |
| 3,181,611 | 5/1965 | Dollarhide | 166/33 |
| 3,397,542 | 8/1968 | Moulden | 61/36 |
| 3,491,916 | 1/1970 | Graham | 222/80 |
| 3,756,388 | 9/1973 | Murphy | 206/47 A |
| 3,798,186 | 3/1974 | Nakade et al. | 260/2.5 A |
| 3,805,531 | 4/1974 | Kistner | 61/36 R |
| 3,882,684 | 5/1975 | Meyer et al. | 61/45 B |

Primary Examiner—H.S. Cockeram
Attorney, Agent, or Firm—Gene Harsh; Lawrence S. Pope; Frederick H. Colen

[57] ABSTRACT

This invention concerns a method of consolidating geological formations, heaped rock and earth masses by applying a polyurethane reaction system to the material to be consolidated. The reaction system comprises a polyisocyanate component and a polyol component wherein the polyol component contains about 5 to 50 wt.% of a special polyether with an OH number under about 100. This polyether is produced by the reaction of a compound having more than one reactive hydrogen atom per molecule and a molecular excess of a 1,2-alkylene oxide. The reaction system can also contain conventional polyurethane additives such as foaming agents, fillers, foam stabilizers and catalysts. In a preferred embodiment, the special polyether is produced from ethylene diamine or triethanol amine.

17 Claims, No Drawings

PROCESS FOR THE CONSOLIDATION OF GEOLOGICAL FORMATIONS AND LOOSENED ROCK AND EARTH MASSES

This is a continuation, of application Ser. No. 598,108, filed July 22, 1975, and now abandoned.

BACKGROUND OF THE INVENTION

German Patent Specification No. 1,129,894 describes a process for sealing or consolidating geological formations against water or gas by means of polyurethane, wherein reaction components forming a cross-linked product with the group —NH—CO—O—, namely a di- or polyisocyanate and a polyol comprising at least three reactive OH groups, mixed together in a liquid vehicle, are forced under pressure into the formation to be sealed or consolidated.

In forming the polyurethane, polyols are usually used having an average molecular weight of 400–600 and an OH number of 350–400. These polyols may be replaced up to about 15% or even completely by a plasticizer, in particular castor oil. Dispite many disadvantageous properties, castor oil is used in practice as a sole or partial cross-linking agent for isocyanates for consolidating geological formations, see for example "Gluckauf" 104 (1968) Volume 15, pages 666–670, German Patent Specification DOS 2,123,271, DBP 1,758,185, and DBP 1,784,458.

One disadvantage of high castor oil contents is the insufficient flexibility which it gives to the hardening polyurethane, which may lead to a premature destruction of the consolidated state of the geological formation, especially with the high dynamic stress on coal and the surrounding rock occurring in mechanical coal production processes in open-cast mining. As the proportion of castor oil in the polyol component is raised, the modulus of elasticity, the compression strength and the bending strength of the polyurethane which brings about the consolidation of the geological formation are reduced, so that the rock pressure and the action of external forces connected with the mechanical production process may cause slip of the consolidated formations.

A further disadvantage is the relatively high viscosity of castor oil, which is approximately 1000 mPa s at 25° C. With higher contents of castor oil in the polyol component, the viscosity of the entire system is raised to such a value that troublefree penetration into the smallest cracks and crevices and the complete wetting of the surface are no longer guaranteed.

The immiscibility of castor oil with water is also a disadvantage. If damp or wet rock is to be consolidated, the castor oil may be separated from the system by the water absorption of the polyol compounds, which are very miscible with water, and thus the castor oil no longer reaches the diisocyanate for reaction. Indeed, a known method for determining castor oil in polyol compounds consists of separating the castor oil by displacement with water.

Another disadvantage is that the castor oil reduces the binding force between the polyurethane and the rock or coal at high castor oil contents in the polyol. Thus, the structure of the consolidated formations is weakened.

SUMMARY OF THE INVENTION

It has now been discovered that the aforementioned disadvantages may be eliminated by using, for consolidating geological formations and heaped rock and earth masses, reacting polyisocyanate/polyol mixtures in which the polyol component contains about 5–50% by weight of a polyether with an OH number under about 100, produced by the reaction between a compound comprising more than one reactive hydrogen atom per molecule and excess 1,2-alkylene oxide.

The polyurethanes produced from such polyol mixtures and which bring about the consolidation of geological formations or heaped rock and earth masses, have high flexibility with a high modulus of elasticity and a high bending strength, have a high binding force to coal and surrounding rock, and resist strong dynamic stresses. It is also easily possible to keep the composition of the said product of reaction constant by holding the reaction conditions constant during its production.

A further advantage of such a polyol mixture is its good compatibility with water, so that separation of the flexibility-conferring component on consolidation of wet or damp formations is impossible.

The polyether preferably has an average molecular weight of about 1500–8000 most preferably of about 2000–3500 and as stated, an OH number under 100, and preferably between 50 and 90.

Constituents with more than one reactive hydrogen atom per molecule for producing suitable polyethers include primarily carboxylic acids, phenols, alcohols and amines.

Examples of carboxylic acids are: phthalic acid, adipic acid, maleic acid, succinic acid.

Examples of phenols are: hydroquinone, pyrocatechin, 4,4'-dihydroxydiphenyl-dimethylmethane.

Examples of alcohols are: ethylene glycol, propylene glycol, trimethylol propane, glycerin, pentaerythritol, mannitol, glucose, fructose and sucrose.

Examples of amines are: ammonia, mono- and diethanolamine, diethylenetriamine, aniline, diaminodiphenylmethane, and especially ethylenediamine and triethanolamine.

Examples of 1,2-alkylene oxides are: ethylene oxide, propylene oxide and 1,2-butylene oxide. Mixtures may be used, or one alkylene oxide may be used in the first reaction stage and another in the second reaction stage, in order to bring about segmentation in the synthesis of the polyether molecule.

The production of the polyether is in accordance with known reactions, see for example Ullmann, No. 14, pages 50–51, 3rd edition 1963 and Polyurethanes: Chemistry and Technology, Volume 1, pages 33–43 by Saunders and Frisch Interscience (1962). The amount of 1,2-alkylene oxide to be used is set by the requirement of reaching an OH number under 100.

The preferred embodiment of the process according to the invention is the use, in the proportion of 5–50% by weight, of those reaction products obtainable from amines and 1,2-alkylene oxides. The described advantages in comparison with castor oil relative to the mechanical properties of the consolidation of the geological formations and heaped rock and earth masses are particularly evident in this case. This result is surprising, particularly in the light of the generally held opinion that polyols containing amine, because of their too rapid reaction with isocyanates, would not be able to accomplish the time consuming impregnation processes concerned in penetrating fine crevices and fissures of the formations to be consolidated, which represents a physical prerequisite for the chemical consolidation itself.

Most remarkable is the fact that the described polyol mixtures have practically the same pot life time as conventional polyols when mixed with isocyanates, and may thus be used for all presently known consolidation methods. The isocyanates used may be any known products which comprise more than one isocyanate group per molecule. Examples are: toluylenediisocyanate, prepolymers with free isocyanate groups formed from multivalent alcohols and toluylenediisocyanate, hexamethylenediisocyanate and its prepolymers, diphenylmethanediisocyanate and mixtures of its various isomers and higher nucleus fractions. Included are the isocyanates and isocyanate terminated prepolymers described in Polyurethanes: Chemistry and Technology by Saunders and Frisch, Interscience (1962) which have more than one NCO group per molecule. The preferred polyisocyanates are the well-known polyisocyanate mixtures which are obtained by phosgenation of aniline - formaldehyde condensates.

The polyols which according to the invention are added to the said ethers may be any polyols known in polyurethane production, such as those described in Polyurethanes pages 32–61, above referenced. Preferred polyols are a) polyhydroxyalkanes having from 2 to 4 hydroxy groups per molecule, molecular weights of about 62 to about 200 such as e.g. ethyleneglycol, 1,2-propanediol, hexamethyleneglycol, trimethylolpropane, glycerol or pentaerythrithol and/or b) (poly)ether polyols with molecular weights of about 106 to 1000 preferably of about 250 to 700 most preferably of about 400 to 600 and OH-numbers of about 200 to 1056 preferably of about 250 to 800 and most preferably of about 350 to 400. Any mixtures of components of a) and b) may be used. The preferred polyols are the (poly)ether polyols mentioned under b). Such (poly)ether polyols are produced for example by reacting trimethylolpropane with propylene oxide (hereinafter called polyol 1) or a mixture of sucrose and 1,2-propanediol with propylene oxide (hereinafter called polyol 6).

Further specific examples for such (poly)ether polyols are e.g. diethylene glycol, triethylene glycol, tetraethylene glycol, dipropylene glycol, tripropylene glycol, ethoxylation and/or propoxylation products of low molecular weight polyhydroxycompounds such as e.g. those mentioned hereinafter under a).

The proportion of the polyol component to be mixed with the isocyanate may be varied within wide limits, but advantageously so much isocyanate is added that 0.5–2 NCO groups are present for each OH group. If the geological formations or the heaped rock and earth masses to be consolidated contain much moisture, it is desirable to use a large excess of isocyanate.

Moreover it is possible to use the usual blending agents known in polyurethane chemistry for modifying the contained polyurethanes, e.g. castor oil, expanding agents such as water and fluorinated hydrocarbons, accelerators such as tertiary amines and metal catalysts (e.g. stannic chloride tin-(II)-octoate or dibutyl-tin-dilaurate) and foam regulators such as organic silicon compounds. Fillers may also be incorporated such as the fly ash described in German Auslegeschrift 1 159 865.

It is further possible to add hydrophylic substances, such as sodium aluminosilicate of the Zeolite type, if it is required to prevent foaming of the consolidating medium.

The advantages of the process according to the invention will be illustrated by the following examples:

In the specified examples, the following substances have the meanings given:

| | |
|---|---|
| Polyol 1: | a polyether polyol, produced from trimethylol propane and propylene oxide, with an OH number of 370, an average molecular weight of 450 and a viscosity of 700 mPa at 25° C. |
| Castor oil: | a commercially available natural product of 1st pressing quality, with an OH number of 148 and a viscosity of about 1000 mPa s at 25° C. |
| Polyol 2: | a polyether polyol, produced from trimethylol propane and propylene oxide, with an OH number of 56 an average molecular weight of about 3000 and a viscosity of 550 mPa s at 25° C. |
| Polyol 3: | a polyether polyol, produced from 1,2-propylene glycol and propylene oxide, with an OH number of 59, an average molecular weight of 2500 and a viscosity of 410 mPa s at 25° C. |
| Polyol 4: | a polyether polyol, produced from ethylene diamine and propylene oxide, with an OH number of 61, an average molecular weight of 3500 and a viscosity of 630 mPa s at 25° C. |
| Polyol 5: | a polyether polyol, produced from triethanolamine and propylene oxide until an OH number of 103 is reached, followed by reaction with ethylene oxide until an OH numnber of 58 is reached, with and average molecular weight of 3200 and a viscosity of 480 mPa s at 25° C. |
| Polyol 6: | a polyether polyol, produced from a mixture of sucrose and 1,2-propanediol in the molecular proportion of 1:5 plus propylene oxide, with an OH number of 380, an average molecular weight of 440 and a viscosity of 580 mPa s at 25° C. |

EXAMPLE 1

100 parts by volume of the polyols and polyol mixtures given in the following Table 1 were mixed with an isocyanate component with an isocyanate content of 31% and a viscosity of 140 mPa s at 25° C., obtained by phosgenating a formaldehyde-aniline condensation product and comprising more than 50% of 4,4-diisocyanate diphenyl methane and with 5 parts by weight of a sodium aluminosilicate of Zeolite type, and cast in metal molds treated with a release agent. After 15 hours of hardening at room temperature, the molds were tempered with hardening completed for 5 hours at 80° C. The properties given in columns 1–3 of Table 1 were determined for the compact unfoamed polyurethane specimens obtained.

To estimate the binding properties with coal and adjacent rock, clay slate and coal prisms of size 4 × 4 × 16 cm were broken and the reaction mixture was cast into them, keeping a constant separation gap of 2 mm. The bending strength of the cemented prisms was then determined and used as a measure of the binding properties.

TABLE 1

| | Polyol | Bending strength MPa DIN 53 452 (equivalent to ASTM D 790) | Deflection mm DIN 53 452 (equivalent to ASTM D 790) | Modulus of Elasticity MPa DIN 7735 | Binding property on coal | MPa on rock |
|---|---|---|---|---|---|---|
| Comparison | 1 | 63 | 1.5 | 2730 | 0.98 | 2.50 |
| Comparison | 6 | 72 | 2.0 | 3420 | 0.87 | 2.58 |
| | 100 parts by wt. 1 + 20 parts by wt. 2 | 80 | 2.5 | 2650 | 0.98 | 2.78 |
| | 100 parts by wt. 1 | | | | | |

TABLE 1-continued

| | Polyol | Bending strength MPa DIN 53 452 (equivalent to ASTM D 790) | Deflection mm DIN 53 452 (equivalent to ASTM D 790) | Modulus of Elasticity MPa DIN 7735 | Binding property on coal | MPa on rock |
|---|---|---|---|---|---|---|
| | + 20 parts by wt. 3 | 81 | 2.5 | 2610 | 0.94 | 2.58 |
| | 100 parts by wt. 1 + 20 parts by wt. 4 | 115 | 3.7 | 2770 | 1.21 | 3.00 |
| | 100 parts by wt. 1 + 20 parts by wt. 5 | 112 | 3.6 | 3100 | 0.78 | 2.00 |
| Comparison | 100 parts by wt. 1 + 20 parts by wt. castor oil | 52 | 1.4 | 2410 | 0.92 | 1.44 |
| | 100 parts by wt. 6 + 20 parts by wt. 4 | 114 | 3.8 | 2810 | 0.88 | 2.29 |

EXAMPLE 2

100 parts by volume of each of the polyol mixtures given in Table 2 were treated as in Example 1. The designation of the polyols agrees with that of Example 1. The properties given in Table 2 were measured.

TABLE 2

| Polyol | Bending strength MPa DIN 53 452 (equivalent to ASTM D 790) | Modulus of Elasticity MPa DIN 7735 | Binding properties on coal | MPa on rock |
|---|---|---|---|---|
| 100 parts by wt.1 + 10 parts by wt.4 | 68 | 2740 | 1.04 | 2.72 |
| 100 parts by wt.1 + 15 parts by wt.4 | 90 | 2750 | 1.16 | 2.84 |
| 100 parts by wt.1 + 20 parts by wt.4 | 115 | 2770 | 1.21 | 3.00 |
| 100 parts by wt.1 + 30 parts by wt.4 | 85 | 2730 | 1.20 | 3.02 |

EXAMPLE 3

100 parts by volume of each of the polyol mixtures given in Table 3, with the same designation of Example 1, were mixed with 1.2 parts by volume of water and 0.6 parts by volume of a polysiloxane for foam stabilization. 100 parts by volume of the isocyanate described in Example 1 were then added to each and agitated for 30 seconds. Foam development in the liquid began in each case after 4 minutes, with solidification of the induced foam after about 15 minutes. The properties given in Table 3 were determined for the obtained foams.

tured in such a way as to intimately blend the two components, and the bore hole is sealed. The reaction system in this application should contain a blowing agent. This method is described in greater detail in U.S. Pat. No. 3,698,196 which is herein incorporated by reference.

In addition the reaction system may be injected under pressure into the material to be consolidated. The injection may be performed by machine with a working pressure of about 60 bar as is described in Glückauf, 108, July 20, 1972 pages 615–618. As discussed therein, it is disadvantageous to work at pressures greater than about 90 bar because of the likelihood of expanding cracks and fissures already present in the material to be consolidated. The machine may be equipped with a two component pump which draws each of the components separately so that they may be mixed immediately in front of or in the hole to which the system is to be

TABLE 3

| | Polyol | Apparent density kgm$^{-3}$ DIN 53 420 (similar to ASTM D 1622) | Compression strength MPa DIN 53 421 (similar to ASTM D 1621) | Modulus of elasticity from compression test according to DIN 53 421 (similar to ASTM D 1621) | on coal wet | on coal dry | on rock wet | on rock dry |
|---|---|---|---|---|---|---|---|---|
| Comparison | 100 parts by wt. 1 + 20 parts by wt. castor oil | 105 | 0.40 | 19.8 | 0.37 | 0.78 | 0.43 | 1.44 |
| | 100 parts by wt. 1 + 20 parts by wt. 4 | 106 | 1.16 | 27.7 | 0.74 | 1.04 | 1.17 | 1.76 |

The polyurethane reaction system may be applied to the material to be consolidated in a variety of ways. The reaction system may be poured into downwards filled drill holes which are then sealed. In such cases, it is advantageous to employ a blowing agent such as water in the reaction system. This process is described in greater detail in German Auslegeschrift No. 1,758,185 or French Pat. No. 2,006,536.

Alternatively, the system can be applied by means of a two-compartment cartridge which maintains the isocyanate and polyol components in separate compartments. A bore hole is drilled and one or more cartridges are inserted into the hole. The cartridges are then fracsupplied. Iron or wooden poles may be inserted into the injection hole prior to injection of the system. This would strengthen the consolidated mass and reduce the amount of system components consumed.

The injection may also be effected by placing each of the system components under pressure in separate containers and then supplying them from these containers to the material to be consolidated, for instance, pipes with one way valves may be provided from each container to a T joint at which the components are mixed and at which additional gas may be provided to insure a more thorough mixing of the components. This method is described in more detail in German Offenlegungsschrift No. 2,123,271 incorporated herein by reference.

Normally, in the pouring and injection embodiments the reactive system includes a foaming agent. However, in certain circumstances, it may be advantageous to employ the system without such an agent so that a solid resin is formed. In such a case it is desirable to add a hydrophilic substance, such as Zeolite type sodium alumino-silicate, as discussed hereinabove. This additive will absorb water from both the polyol component (water is quite miscible with most polyethers) and the environment to which the system is applied thus preventing substantial foaming from occurring. The solid resin systems offer greater strength for those special applications wherein it is required.

A number of specific sequences for applying the reaction system of the present invention to the material to be consolidated will occur to those skilled in the art. The particular embodiments of the present invention are therefore not limited to those described above but rather the scope of the invention is defined by the claims and descriptions of particular embodiments are merely exemplary.

From the preceding examples and Tables, it is evident that the binding force on coal and rock of the polyurethanes according to the invention is considerably improved with relation to the binding force usual with polyurethanes made flexible with castor oil. The bending strength, deflection and modulus of elasticity are considerably more favorable for consolidating coal and rock.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for consolidating geological formations comprising applying an at least two-component reactive polyisocyanate/polyol mixture to the material to be consolidated wherein said reactive polyisocyanate/polyol mixture comprises:
   (a) a polyisocyanate, and
   (b) a polyol mixture comprising
      (i) about 5-50% by weight of a polyether polyol having an OH number under 100 produced by the reaction between a compound having more than one reactive hydrogen atom per molecule and a molar excess of 1,2-alkylene oxide, and
      (ii) about 95-50% by weight of a polyol selected from the group consisting of a polyhydroxyalkane having 2 to 4 hydroxy groups with a molecular weight of about 62 to 200 and a polyether polyol having an OH number of about 200 to 1056 with a molecular weight of about 106 to 1,000, and wherein said reactive polyisocyanate/polyol mixture undergoes an isocyanate polyaddition reaction in the material to be consolidated.

2. A process as claimed in claim 1, wherein the compound comprising more than one reactive hydrogen atom per molecule is an amine.

3. A process as claimed in claim 2 wherein the polyether is produced from the reaction of ethylene diamine and/or excess triethanolamine with 1,2-alkylene oxide.

4. A process as claimed in claim 3 wherein the 1,2-alkylene oxide is propylene oxide and/or ethylene oxide.

5. A double chamber cartridge consisting of two chambers containing respectively a polyisocyanate and a polyol, wherein the polyether as set forth in claim 1 is added to the polyol component.

6. The process of claim 1 wherein the polyol comprises
   (a) about 50 to 95 wt.% of polyethers having molecular weights of about 400 to 600 and OH numbers of about 350 to 400 and
   (b) about 50 to 5 wt.% of polyethers having molecular weights of about 2000 to 3500 and OH numbers of about 50 to 90.

7. The process of claim 6 wherein the reactive mixture is injected into the material to be consolidated.

8. The process of claim 7 wherein the reaction components are supplied from separate pressurized containers.

9. The process of claim 7 wherein the injection is effected by a machine operating at pressures up to about 90 bar and having a two component pump which draws each of the components separately.

10. The process of claim 6 wherein the compound reacted with the 1,2-alkylene oxides to produce the polyethers with OH numbers between about 50 and 90 is an amine.

11. The process of claim 10 wherein the amine is ethylene diamine or triethanolamine.

12. The process of claim 1 wherein the reactive mixture contains a blowing agent.

13. The process of claim 12 wherein the mixture is applied by inserting a two compartment cartridge which maintains the polyol and polyisocyanate components in separate compartments into a hole in the material to be consolidated, fracturing the cartridge in such a way to insure good mixing of the components and sealing the hole.

14. The process of claim 1 wherein the mixture is applied by pouring the components before they harden into a downwardly sloping drill hole in the material to be consolidated and then sealing the drill hole.

15. The process of claim 1 wherein the polyisocyanate is a monomeric polyisocyanate.

16. The process of claim 15 wherein the monomeric polyisocyanate component is obtained by phosgenation of a formaldehyde-aniline condensation product.

17. A process for consolidating geological formations encountered in coal mining comprising applying an at least two-component reactive polyisocyanate/polyol mixture to the material to be consolidated wherein the reactive polyisocyanate/polyol mixture comprises:
   (a) a polyisocyanate, and
   (b) a polyol mixture comprising
      (i) about 5-50% by weight of a polyether polyol having an OH number under 100 produced by the reaction between a compound having more than one reactive hydrogen atom per molecule and a molar excess of 1,2-alkylene oxide, and
      (ii) about 95-50% by weight of a polyol selected from the group consisting of a polyhydroxyalkane having 2 to 4 hydroxy groups with a molecular weight of about 62 to 200 and a polyether polyol having an OH number of about 200 to 1056 with a molecular weight of about 106 to 1,000, and wherein said reactive polyisocyanate/polyol mixture undergoes an isocyanate polyaddition reaction in the material to be consolidated.

* * * * *